(12) United States Patent
Zeibel et al.

(10) Patent No.: US 11,467,036 B2
(45) Date of Patent: Oct. 11, 2022

(54) COLD-TUNNEL SYSTEM AND METHOD FOR RECOVERY OF THERMAL EMISSIVITY OF EXTENDED TARGETS

(71) Applicant: United States of America, as represented by the Secretary of the Army, Washington, DC (US)

(72) Inventors: Jason G. Zeibel, Fairfax Station, VA (US); William Paul Blase, Alexandria, VA (US); John K. Delaney, Bethesda, MD (US)

(73) Assignee: UNITED STATES OF AMERICA, AS REPRESENTED BY THE SECRETARY OF THE ARMY, Washington, DC (US)

( * ) Notice: Subject to any disclaimer, the term of this patent is extended or adjusted under 35 U.S.C. 154(b) by 3 days.

(21) Appl. No.: 17/361,499

(22) Filed: Jun. 29, 2021

(65) Prior Publication Data

US 2022/0026279 A1    Jan. 27, 2022

Related U.S. Application Data

(60) Provisional application No. 63/056,775, filed on Jul. 27, 2020.

(51) Int. Cl.
*G01J 5/061*    (2022.01)
*G01J 5/0806*   (2022.01)
*F25D 23/06*    (2006.01)
*G01J 5/00*     (2022.01)

(52) U.S. Cl.
CPC ............ *G01J 5/061* (2013.01); *G01J 5/0806* (2013.01); *F25D 23/061* (2013.01); *G01J 2005/0077* (2013.01)

(58) Field of Classification Search
CPC .. G01J 5/061; G01J 5/0806; G01J 2005/0077; F25D 23/061
See application file for complete search history.

(56) References Cited

U.S. PATENT DOCUMENTS

| | | | |
|---|---|---|---|
| 3,963,926 A | 6/1976 | Borrello | |
| 4,827,130 A * | 5/1989 | Reno | ...... G02B 23/12 250/353 |

OTHER PUBLICATIONS

J. G. Zeibel "Leveraging high performance hyperspectral sensors for the conservation of masterworks", Proc. SPIE 11392, Algorithms, Technologies, and Applications for Multispectral and Hyperspectral Imagery XXVI, 113920I, abstract online (Apr. 29, 2020) https://doi.org/10.1117/12.2559383.

* cited by examiner

*Primary Examiner* — Hugh Maupin
(74) *Attorney, Agent, or Firm* — Richard J. Kim

(57) ABSTRACT

A cold-tunnel system is disclosed for recovery of thermal emissivity of extended targets. The cold-tunnel system is comprised of an infrared camera having a thermal imaging lens; an aperture plate having a hole aligned with the thermal imaging lens; four cold-wall panels assembled in a box pattern as a cold-tunnel assembly to form a cold tunnel; an air-blowing desiccator affixed to each cold-wall panel; an external liquid chiller to chill a reservoir of working fluid; a target under test; and an extended source blackbody reference disposed directly behind the target under test.

20 Claims, 4 Drawing Sheets

COLD-TUNNEL SYSTEM AND METHOD FOR RECOVERY OF THERMAL EMISSIVITY OF EXTENDED TARGETS

CROSS-REFERENCE TO RELATED APPLICATIONS

This application claims priority to U.S. Provisional Patent Application No. 63/056,775, filed on Jul. 27, 2020, the disclosure of which is incorporated herein by reference in its entirety.

GOVERNMENT INTEREST

The invention described herein may be manufactured, used, sold, imported, and/or licensed by or for the Government of the United States of America.

FIELD OF THE INVENTION

This invention relates in general to testing for characteristic emissivity, and more particularly, to a cold-tunnel system for recovery of thermal emissivity of extended targets.

BACKGROUND OF THE INVENTION

NVESD, S&T routinely test various test articles for their characteristic reflectivity and emissivity across various portions of the electro-optic and infrared (EOIR) portions of the electromagnetic spectrum. This is typically done in the laboratory through the use of a benchtop spectrometer or Fourier Transform Infrared Reflectometer (FTIR). Each of these devices is capable of absolute measurements of reflectivity and emissivity of a sample, but these measurements sample a single point and can take many minutes for a single measurement as a function of wavelength. These type of instruments perform their measurements through a differential methodology, by illuminating the target with an intense source of light and subtracting off any background illumination by taking a second measurement (often called a "dark reference") with the instrument's light source shuttered.

SUMMARY OF THE INVENTION

A cold-tunnel apparatus utilizes an infrared camera that is able to image in high resolution in the thermal portion of the electromagnetic spectrum. Further, a thermal imaging lens is used with the infrared camera. In order to avoid unwanted background radiation from being incident on a target, an aperture plate is inserted over a non-target end of the tunnel. Four cold-wall assemblies are arranged in a box pattern. The inner surfaces of the cold-wall assemblies are coated with an ultra-flat black, highly emissive coating and are held at approximately −10 C during measurements.

In another aspect, a cold-tunnel assembly is disclosed for recovery of thermal emissivity of extended targets. An exemplary cold-tunnel assembly is made of four panels which are cooled by chilled working fluid from an industrial chiller. The panels are each based on a cooled aluminum plate, which has cooling channels running through it for the chilled working fluid; an inside cover plate which has a smooth surface and is ultra-flat black for low infra-red reflectivity; exterior insulation; and a laminar-flow air system which recirculates dry, cooled air. The panels and associated plumbing are mountable to a framework.

BRIEF DESCRIPTION OF THE DRAWINGS

Additional advantages and features will become apparent as the subject invention becomes better understood by reference to the following detailed description when considered in conjunction with the accompanying drawings wherein.

DETAILED DESCRIPTION

Figure 1:
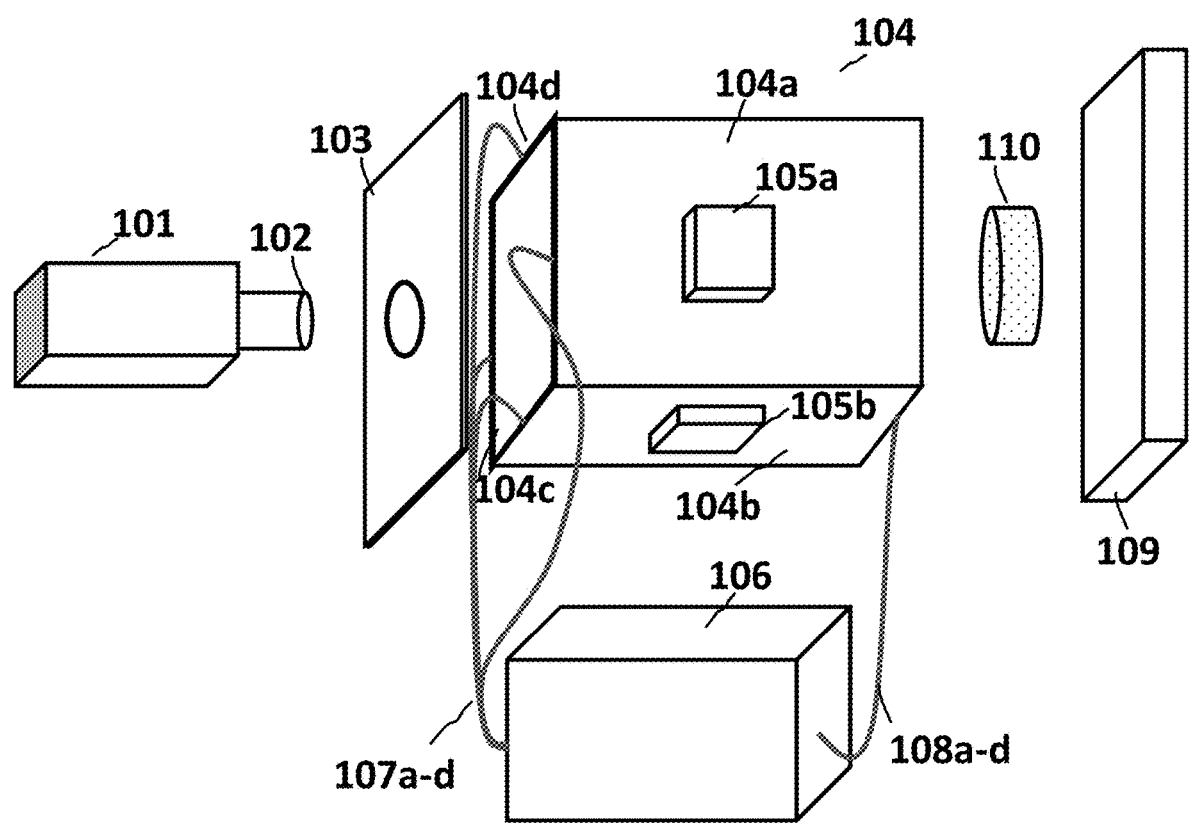
FIG. 1 shows an exemplary cold-tunnel apparatus.

In order to obtain reflectivity and emissivity values from large or spatially extended targets, it is necessary to take many separate measurements. This is typically done by using an imaging spectrometer or hyperspectral camera—though it can be done using a single or few-band camera system as well. For the reflective portion of the EOIR spectrum (ultraviolet, visible, near-infrared, and short-wave infrared, or 300 nm-3000 nm), these measurements can be done in the laboratory by precisely controlling and characterizing an external illumination setup such as photography lamps or Quartz-Tungsten-Halogen (QTH) lamps. As in the case of the benchtop instruments, two separate measurements are undertaken—one with the illumination on in a steady-state, and another with all illumination sources turned off. If one carefully measures the absolute illumination at the target location, then the reflectivity of a target can be recovered from each point and a calibrated reflectivity image can be generated.

These type of absolute measurements however were not possible in general in the thermal portion of the EOIR spectrum until recently. For wavelengths between 3 microns and 14 microns, encompassing the mid-wave infrared (MWIR) and long-wave infrared (LWIR), there are two challenges that make obtaining the per-pixel absolute emissivity and reflectivity very difficult in a laboratory environment. First, there has not been a practical method to obtain a "thermal dark reference". Since all objects in the laboratory are emitting light in the thermal portion of the spectrum, everything is a light source to the target under study. Second, using a large thermal source, like a heat lamp, to provide additional illumination to a target under study tends to significantly and unevenly raise the temperature of the target. This significantly complicates the math that must be undertaken to obtain meaningful values of the target emissivity since the target is both reflecting light and emitting light itself. In practice is it not possible to measure the target temperature at every point on the target without knowing the emissivity, which is the unknown quantity being searched for.

In this invention, NVESD scientists have developed hardware and a methodology to recover the absolute emissivity from an extended target as a function of wavelength in the thermal EOIR bands. Through the use of a cold-tunnel apparatus (FIG. 1) with carefully measured and instrumented walls, combined with an extended source blackbody temperature reference held at ambient room temperature, the absolute emissivity in the thermal EOIR bands as a function of wavelength can be recovered.

The cold-tunnel is large enough to encompass the entire target under study so that effectively the entire view of the room seen by the target is held at a constant sub-zero temperature. This greatly reduces the thermal background seen by the target to a known and well-characterized value. Meanwhile, the target is held at room ambient by the large blackbody thermal reference placed immediately behind it. This creates a steady-state thermal condition with a large and well-characterized thermal gradient, where the emitted light from the target itself contributes almost entirely to the at-sensor measured signal and the reflected thermal light is drastically reduced. Furthermore, the exact amount of remaining thermal light that is incident upon the target is known and can be entered into the equations directly to solve for the emissivity of the target. Therefore, by employing the cold-tunnel setup, absolute emissivity and reflectivity in the thermal infrared can be recovered as a function of wavelength for extended targets.

Figure 2:
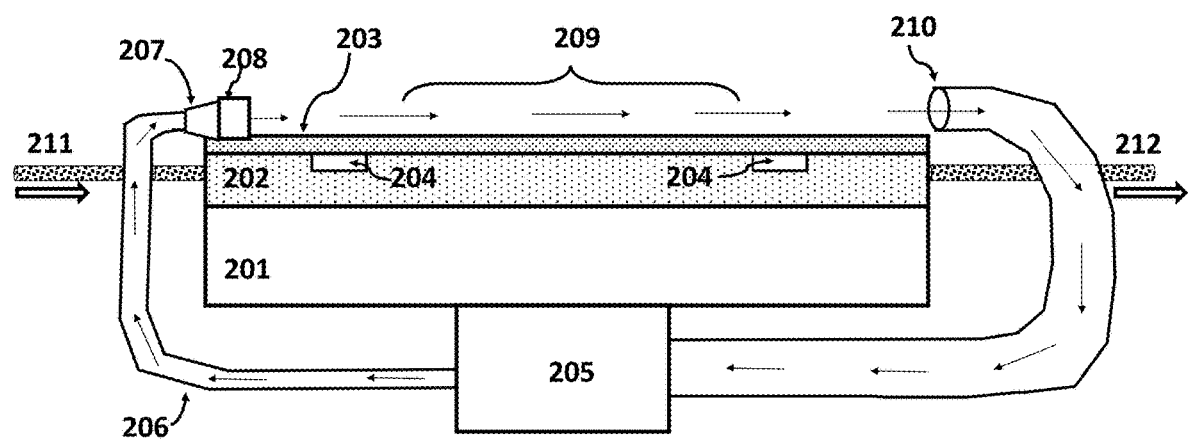
FIG. 2 shows an exemplary cross-sectional view of cold wall assemblies.

The cold-tunnel apparatus shown in FIG. 1 utilizes an infrared camera (101) that is able to image in high resolution in the thermal portion of the electromagnetic spectrum. In order to recover emissivity as a function of wavelength, this IR camera is able to see in many narrow spectral channels within the thermal infrared. A thermal imaging lens (102) is used with the infrared camera (101) so that the field of view of the infrared camera is approximately matched but slightly larger than the opening at the end of the tunnel. In order to avoid unwanted background radiation from the room from being incident on the target (110), an aperture plate (103) is inserted over the non-target end of the tunnel so that the lens (102) fits just through the hole in the aperture plate. The aperture plate (103) is fabricated of aluminum and highly diffusely polished in order to create a matte surface on the side that faces the target (110) in order to reflect any thermal radiation coming from the target back into the cold tunnel. The emissivity of the aperture plate (103) must be low and well characterized via laboratory measurement. Four cold-wall assemblies (104a-104d) are arranged in a box pattern (104). The cold wall assemblies (104) are described in a cross-section perspective as shown in FIG. 2. The inner surface of the cold-wall assemblies (104) are coated with an ultra-flat black, highly emissive coating and are held at approximately −10 C. during measurements. The absolute temperature of the cold wall assemblies (104) is not critical to the measurements as long as the temperature is significantly below the temperature of the target (110) and the value is known precisely.

Affixed to each cold-wall assembly (104a-104d) is an air-blower/desiccator (105a-105d) that forces cold dry air across the inside surface of the cold-tunnel walls to prevent any frost from forming on the cold-wall assemblies (104). The cold dry air is directed to move in a Laminar flow across the inside surface of the cold-wall assembly (104). This is achieved through the nozzle design described in FIG. 3. An external liquid chiller (106) refrigerates a reservoir of polyethylene glycol down to a temperature of approximately −20 C. The refrigerated liquid travels via four supply lines (107a-107d), one per each of the four cold-wall assemblies (104a-104d). Within the cold-wall assemblies, the refrigerated liquid circulates in an interior channel of an Aluminum plate, cooling the plate significantly. The refrigerated liquid then returns to the external liquid chiller (106) via the four return lines (108a-108d). On the target end of the tunnel, a target under study (110) is positioned so that it is close to the end of the cold-tunnel. Located directly behind the target (110) is an extended source blackbody reference (109) that is maintained at a fixed, near-ambient or slightly-above ambient temperature during data collection events. Thermocouples are located on the four cold-wall assemblies (104a-104d), the blackbody thermal reference plate (109), the target itself (110), and within the larger room. Temperature measurements are continuously taken on each of these thermocouples.

A cross section of one of the four cold-wall assemblies is shown in FIG. 2. A thick sheet of insulating foam (201) is bonded to the back of the 24"×36" liquid cooled anodized aluminum plate (202). The liquid cooled aluminum plate (202) has a highly parallel channel contained within it to allow the chilled liquid to flow slowly throughout, cooling the plate to near the temperature of the chilled liquid. The chilled liquid enters the liquid cooled aluminum plate (202) from the polyethylene glycol chiller (106) via the supply line (211), and exits from the liquid cooled aluminum plate (202) into the chilled liquid return line (212).

A thin (~⅛") aluminum cover plate (203) is bonded to the liquid cooled aluminum plate (202) with highly conductive thermal grease to maximize the thermal conductivity. The front surface of the aluminum cover plate (203) is coated with highly emissive ultra-flat black paint. Two calibrated thermocouple temperature measurement devices (204) are mounted on each cold-wall assembly in order to accurately record the wall temperature.

An air blower/desiccator (205) is mounted to the insulating foam (201) of each of the cold-wall assemblies. The air blower/desiccator forces cold, dry air through the air exhaust ducting (206) and into the expansion manifold (207) located on the side of the plate closest to the infrared camera (101). After the air passes through the expansion manifold (207), it enters a foam pressure equalizer and flow straightener (208) in order to ensure that the air is in laminar flow (209) as it passes across the face of the aluminum cover plate (203). On the other side of the aluminum cover plate is the air intake (210), which directs the air back to the air blower/desiccator (205) in order to complete the circulation.

Figure 3:
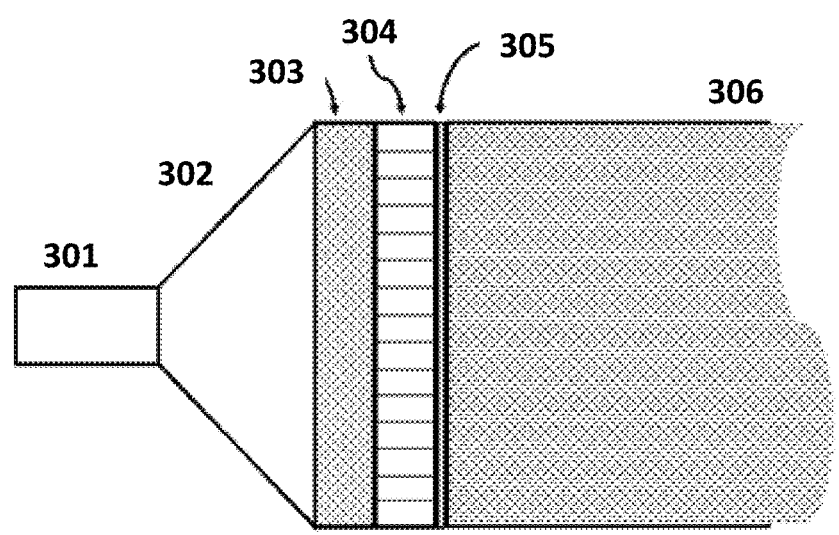
FIG. 3 shows an exemplary laminar-flow exhaust system.

The laminar-flow air exhaust system is shown in FIG. 3 and is a key enabler in being able to successfully perform emissivity measurements with the cold-tunnel system. Unless the plates are covered with cold-dry air they will accumulate frost from any ambient moisture in the laboratory's air. By ensuring cold, dry air in laminar flow across the surface of the aluminum cover plates (203), frost is prevented from forming in the system and the cold-tunnel walls remain highly emissive. The air system recirculates chilled air from the panel surface. It captures air at the target end with an air intake that extends the width of the panel (210) and blows it through a cooler that is chilled by the same chilled liquid that is cooling the liquid cooled aluminum plates (202).

The laminar-flow exhaust system (FIG. 3) forms a sheet of air that follows the surface of the plate in a clean, non-turbulent sheet. By forming a thin sheet, the majority of the same air can be captured by the intake and recirculated, thus avoiding introducing new humidity into the system. The ducting coming from the air blower/desiccator (301) funnels the cold, dry air into an expansion manifold (302). From there, a foam pressure equalizer (303) equalizes the pressure across the entire width of the air stream. From there, it passes through a flow straightener section (304) which is a series of small tubes (e.g. large plastic straws) to ensure that all parts of the air stream are running parallel and in the proper direction, reducing turbulence in the air flow. The result is a very evenly distributed air flow across the entire width of the plate and approximately one inch high. An important feature of the laminar-flow exhaust system (FIG. 3) is the small, approximately 1 mm high, lip between the nozzle exit at the plate (305). Because of this lip, the air emerging from the nozzle experiences the Coandă effect and "adheres" to the plate surface (306).

The cold-tunnel itself (parts 103, 104, and 105), along with all supply and return lines connected to it, are mounted within a framework made from extruded aluminum rails which sits on rollers. This cage is not shown in the figures, but encompasses and protects the systems and adds rigidity. By placing the assembly on rollers, it can be moved up to the target and locked in to place for data collection activities.

Figure 4:
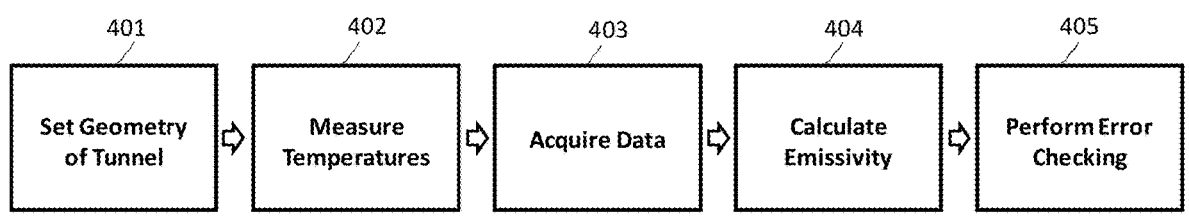
FIG. 4 shows an exemplary method to recover emissivity from a target using the cold-tunnel setup.

The basic methodology that is used to recover emissivity from a target using the cold-tunnel setup is described in FIG. 4. The first step (401) involves setting the geometry of the cold-tunnel. This is done by ensuring that a minimum of room radiation enters into the tunnel. The reflective aperture (103) must be fit relatively tightly around the lens (102) of the infrared camera (101). The target under study (110) must be placed just beyond the end of the cold-tunnel, and just in front of the reference blackbody (109). The distance between the target (110) and the end of the cold tunnel must be measured. The fraction of the 2-pi steradian hemisphere seen by the target that encounters the cold walls must be determined. This is a geometrical calculation and varies very slightly depending on the size of the lens of the camera used and the size of the target. In most cases, this number is well over 90% of the full 2-pi hemisphere and is calculated a-priori from the size of the cold-tunnel.

The next step in the cold-tunnel methodology is to properly measure the temperatures involved in the setup (402). The most critical ones are the temperatures of the cold walls on the inside of the tunnel (203). With eight thermocouples (204) embedded within the cold-wall assemblies (104), there are eight measurements of the wall temperatures. Ideally, these are consistent to within 1 C. The mean of these eight values is taken as the wall temperature for later calculations. In addition to the wall temperatures, the temperature of the reference blackbody (109) and target under test (110) must be measured via thermocouple contact measurements. Finally, the ambient room temperature external to the cold-tunnel setup is measured to account for the small fraction of room radiation that makes it into the setup.

Next, data is acquired via the infrared camera (101). A non-uniformity correction (NUC) should be acquired immediately before acquiring data on the target under test (110). Then infrared sensor data is acquired of a sufficient field of view to image the far end of the cold-tunnel walls, as well as the target under test (110) and the reference blackbody (109).

After data is acquired, the emissivity calculations can be performed (404). This is accomplished by solving the radiance equation for emissivity as a function of wavelength. Inputs to the this equation are the temperature measurements performed (402), the blackbody emission from the target, the solid angle of light arriving at the target from the cold-tunnel walls, the solid angle of light arriving at the target from the reference blackbody (109), and the reflectivity and specularity of the aperture plate (103). With these parameters, the absolute emissivity can be recovered in the laboratory for an extended target.

The final step in the emissivity recovery methodology (405) involves performing error correction on the result. All recovered emissivity values are expected to be between zero and one. If a recovered answer is outside these bounds, then an error has occurred. Most targets under study have canonical values for general emissivity in the published literature. These values are from point spectrometer measurements which are accurate, but limited in spatial extent. Comparing results with such bench-top measurements in the literature provides a check on any recovered results. Finally, at regular intervals, a known emissivity target should be measured with the cold-tunnel setup in order to ensure that recovered values are consistent over time and match the calibrated results.

It is obvious that many modifications and variations of the present invention are possible in light of the above teachings. It is therefore to be understood that within the scope of the appended claims, the invention may be practiced otherwise than as described.

What is claimed is:

1. A cold-tunnel system for recovery of thermal emissivity of extended targets, comprising:
    an infrared camera having a thermal imaging lens disposed in a room to image in high resolution a field of view in a thermal portion of the electromagnetic spectrum;
    an aperture plate having a hole aligned with the thermal imaging lens to avoid unwanted background radiation from the room from being incident on a target end;
    four cold-wall panels assembled in a box pattern as a cold-tunnel assembly to form a cold tunnel having a near end facing the hole on an opposite side of the aperture plate, wherein inner surfaces of the cold-wall panels are coated with an ultra-flat black, highly emissive coating to form cold walls;
    an air-blowing desiccator affixed to each cold-wall panel to force cold dry air across the respective inner surface of the cold-wall panel and prevent frost from forming on the cold-tunnel assembly;
    an external liquid chiller to chill a reservoir of working fluid, wherein the chilled working fluid is supplied using four supply lines, each supply line connected to a respective supply end of the respective cold-wall panel, and wherein the working fluid then returns to the external liquid chiller using four return lines, each return line connected to a respective return end of the respective cold-wall panel;
    a target under test disposed close to a far end of the cold-tunnel assembly; and
    an extended source blackbody reference disposed directly behind the target under test.

2. The cold-tunnel system according to claim 1, wherein the infrared camera is capable of operating in narrow thermal infrared channels to recover emissivity of a target as a function of wavelength.

3. The cold-tunnel system according to claim 1, wherein the thermal imaging lens is optically aligned so that the field of view of the infrared camera is approximately matched, but slightly larger than a cold tunnel opening at the far end of the cold-tunnel assembly.

4. The cold-tunnel system according to claim 1, wherein the aperture plate is fabricated of aluminum and highly diffusely polished on an opposite side to create a matte surface facing the target and reflect any thermal radiation coming from the target back into the cold tunnel, keeping emissivity of the aperture plate characteristically low.

5. The cold-tunnel system according to claim 1, wherein the reservoir of working fluid is capable of being chilled down to a temperature of approximately −20 C, or alternatively, the inner surfaces of the cold-wall panels are held at approximately −10 C during measurements, such that the cold tunnel is kept significantly colder than the target.

6. The cold-tunnel system according to claim 1, wherein said air-blowing desiccator affixed to each cold-wall panel has a nozzle to direct the cold dry air to move in a Laminar flow across the respective inner surface of the cold-wall panel.

7. The cold-tunnel system according to claim 1, comprising a setup of thermocouples, thermocouples being located on each of the four cold-wall panels, the extended source blackbody reference, the target, and within the room to continuously take temperature measurements from each of the thermocouples.

8. The cold-tunnel system according to claim 1, wherein said extended source blackbody reference disposed directly behind the target is maintained at a fixed, near-ambient or slightly-above ambient temperature during data collection events.

9. The cold-tunnel system according to claim 1, wherein a cold-wall panel is comprised of a cooled aluminum plate having cooling channels running through it for the chilled working fluid; an inside cover plate which has a smooth surface that is ultra-flat black for low infra-red reflectivity; exterior insulation; and a laminar-flow air system which recirculates the cold dry air.

10. The cold-tunnel system according to claim 9, wherein the working fluid is polyethylene glycol which circulates in an interior channel of the aluminum plate, cooling the aluminum plate significantly; and wherein the working fluid is also used to chill a cooler for the cold dry air.

11. The cold-tunnel system according to claim 9, wherein the cold-wall panels, along with the supply and return lines, are mounted within a framework made from extruded aluminum rails which sits on rollers.

12. The cold-tunnel system according to claim 1, wherein a cold-wall panel of said cold-tunnel assembly is comprised of:
a thick sheet of insulating foam;
a liquid cooled anodized aluminum plate having a highly parallel channel contained within it to allow the chilled working fluid to flow slowly throughout, wherein the chilled working fluid enters the liquid cooled anodized aluminum plate from the external liquid chiller via its supply line, and exits from the liquid cooled anodized aluminum plate into its return line;
a thin aluminum cover plate bonded to the liquid cooled anodized aluminum plate with highly conductive thermal grease to maximize a thermal conductivity, a front surface of the thin aluminum cover plate being coated with highly emissive ultra-flat black paint to form a cold face, wherein two calibrated thermocouple temperature measurement devices are mounted on the thin aluminum cover plate to accurately record cold-face temperatures; and
an air blowing desiccator mounted to the thick sheet of insulating foam, a camera-facing end of the air blowing desiccator being connected to one end of an air exhaust ducting, and a far end of the air blowing desiccator being connected to one end of an air intake;
a laminar-flow air exhaust system having an expansion manifold located on a camera-facing end of the thin aluminum cover plate closest to the infrared camera, to which another end of the air exhaust ducting is connected; and
an air intake on a far end of the thin aluminum cover plate to which another end of the air intake is connected.

13. The cold-tunnel system according to claim 12, wherein said camera-facing end of the air blowing desiccator forces cold, dry air through the air exhaust ducting connected to the expansion manifold of the laminar-flow air exhaust system to result in a laminar flow of air to pass across the cold face of the thin aluminum cover plate for return of the laminar flow of air back to said far end of the air blowing desiccator through the air intake disposed at the far end.

14. The cold-tunnel system according to claim 12, wherein the laminar-flow air exhaust system is comprised of:
an expansion manifold to which said another end of the air exhaust ducting connects;
a foam pressure equalizer to equalize pressure across an entire width of an air stream;
a flow straightener section based on a series of small tubes to direct the air stream in a parallel and set direction to reduce turbulence in a resulting air flow that is distributed across an entire width of the cold face of the thin aluminum cover plate; and
a nozzle exit arranged with a small, approximately 1 mm high, lip at the thin aluminum cover plate to induce a flow of air emerging from the nozzle exit to adhere to the cold face due to Coandă effect.

15. A method for recovery of thermal emissivity of extended targets using the cold-tunnel system according to claim 1, said method comprising the steps of:
set geometry of the cold-tunnel system in a room such that unwanted background radiation from the room into the cold tunnel is minimized;
measure temperatures using a setup of thermocouples located on the cold-wall panels, the extended source blackbody reference, the target, and within the room, wherein the thermocouples located on the cold-wall panels are embedded to take temperature measurements of the inner surfaces of the cold-wall panels;
acquire infrared sensor data using an infrared camera of sufficient field of view to view a far end of the cold tunnel and image the target under test with the extended source blackbody reference;
calculate emissivity by solving a radiance equation for emissivity as a function of wavelength using the acquired infrared sensor data to recover emissivity; and
perform error correction on the recovered emissivity, whereby absolute emissivity of an extended target is recovered using the cold-tunnel system.

16. The method according to claim 15, wherein the step of performing error correction includes checking recovered emissivity values against error bounds, canonical values of general emissivity, and emissivity measurements of a known emissivity target using the cold-tunnel setup.

17. The method according to claim 15, wherein the step of setting geometry of the cold-tunnel system is comprised of the following steps:
fitting the aperture plate relatively tightly around the thermal imaging lens of the infrared camera;
placing the target under test just beyond the far end of the cold tunnel, and just in front of the extended source blackbody reference;
measuring a distance between the target under test and the far end of the cold tunnel; and
determining a fraction of a 2-pi steradian hemisphere seen by the target that encounters the cold walls using a geometrical calculation based on the sizes of the thermal imaging lens, the infrared camera and the target under test.

18. The method according to claim 15, wherein for the step of measuring temperatures, eight thermocouples are embedded within the four cold-wall panels to take eight temperature measurements of the inner surfaces of the cold-wall panels; temperatures of the extended source blackbody reference and target under test are measured via separate thermocouple contact measurements; and an ambient temperature of the room external to the cold-tunnel system is measured to account for unwanted background radiation that may have entered the cold tunnel from the room.

19. The method according to claim 15, wherein non-uniformity correction is acquired before acquiring the infrared sensor data of the target under test.

20. The method according to claim 15, wherein emissivity is calculated using inputs to the radiance equation chosen from the group consisting of the temperature measurements, a blackbody emission from the target, a solid angle of light arriving at the target from the cold-wall panels, a solid angle of light arriving at the target from the blackbody reference, and a reflectivity and specularity of the aperture plate.

* * * * *